United States Patent Office 2,866,795
Patented Dec. 30, 1958

2,866,795

PREPARATION OF 5-NITRO-2-FURALDEHYDE SEMICARBAZONE

Geoffrey Swain, Manchester, England, assignor to Imperial Chemical Industries Limited, London, England, a corporation of Great Britain No Drawing. Application May 25, 1956
Serial No. 587,201

Claims priority, application Great Britain June 10, 1955

5 Claims. (Cl. 260—347.3)

This invention relates to the manufacture of an organic compound and more particularly it relates to a process for the manufacture of 5-nitro-2-furaldehyde semicarbazone.

It has been proposed in U. K. patent specification No. 649,027 to manufacture 5-nitro-2-furaldehyde semicarbazone by reacting 5-nitro-2-furaldehyde diacetate with semicarbazide hydrochloride in the presence of water and in the presence of a strong mineral acid under the influence of heat.

We have now found that 5-nitro-2-furaldehyde semicarbazone can more conveniently be manufactured by a process which is also advantageous in that it does not involve the use of the starting material semicarbazide hydrochloride which is known to be liable to decomposition in solution and to be corrosive against certain metals.

Thus according to the invention we provide a process for the manufacture of 5-nitro-2-furaldehyde semicarbazone which comprises interaction of 5-nitro-2-furaldehyde diacetate and a semicarbazone of an aldehyde or ketone.

As a suitable semicarbazone of an aldehyde or ketone there may be mentioned for example acetone semicarbazone, benzal semicarbazone and methylethyl ketone semicarbazone.

The reaction may conveniently be carried out in the presence of an acid and such acid is preferably a strong acid. However it is to be understood that the expression "a strong acid" as used herein includes both inorganic and organic strong acids. Thus as suitable strong acids there may be mentioned for example sulphuric acid, hydrochloric acid, nitric acid, phosphoric acid, monochloracetic acid, dichloracetic acid and trichloracetic acid.

The reaction may if desired be carried out in the presence of an inert solvent or diluent and as such inert solvent or diluent there may be mentioned for example methanol, ethanol, acetic acid and aqueous media for example water, aqueous methanol, aqueous ethanol, dilute aqueous acetic acid and dilute aqueous β-ethoxyethanol.

The reaction may also be assisted or completed by the application of heat.

The aldehyde or ketone semicarbazone used as starting material in the said process may be obtained by any of the processes known to the art for example by interaction of the aldehyde or ketone for example acetone and semicarbazide.

The invention is illustrated but not limited by the following examples in which the parts are by weight:

*Example 1*

12 parts of acetone semicarbazone are added portionwise during about 36 minutes to a stirred solution of 24.3 parts of 5-nitro-2-furaldehyde diacetate and 7.4 parts of sulphuric acid (density=1.84) in 88 parts of methanol and 11 parts of water at 50–55° C. The temperature of the stirred reaction mixture is then raised to 60–65° C. during 15 minutes and is then maintained at 60–65° C. during a further 30 minutes. The reaction mixture is then cooled to about 35° C. and is filtered. The solid residue is washed with methanol and there is thus obtained 5-nitro-2-furaldehyde semicarbazone as a yellow crystalline solid, M. P. 238–240° C. with decomposition.

*Example 2*

16.5 parts of benzal semicarbazone are added portionwise during one hour to a stirred solution of 24.3 parts of 5-nitro-2-furaldehyde diacetate and 7.4 parts of sulphuric acid (density=1.84) in 88 parts of methanol and 11 parts of water at 50–55° C. The temperature of the reaction mixture is kept at 50–55° C. for 30 minutes and is then raised to 60–65° C. for 15 minutes. The reaction mixture is then cooled to 40° C. and filtered. The solid residue is washed with methanol and dried and there is thus obtained 5-nitro-2-furaldehyde semicarbazone as a yellow crystalline solid.

*Example 3*

13.0 parts of methylethyl ketone semicarbazone are added portionwise during 30 minutes to a stirred solution of 24.3 parts of 5-nitro-2-furaldehyde diacetate and 7.4 parts of sulphuric acid (density=1.84) in 88 parts of methanol and 11 parts of water at 50–55° C. The reaction mixture is then heated to 65° C. and is kept at this temperature for 15 minutes. The reaction mixture is then cooled to 40° C. and filtered and the solid residue is washed with methanol. There is thus obtained 5-nitro-2-furaldehyde semicarbazone as a yellow crystalline solid, M. P. 238–240° C. with decomposition.

What I claim is:

1. Process for the manufacture of 5-nitro-2-furaldehyde semicarbazone which comprises reacting 5-nitro-2-furaldehyde diacetate and a semicarbazone selected from the group consisting of acetone semicarbazone, benzal semicarbazone and methylethyl ketone semicarbazone, in the presence of a catalytic amount of a strong acid sufficient to hydrolyze said diacetate.

2. Process as claimed in claim 1 wherein the strong acid is utilized, said acid being selected from the group consisting of sulphuric acid, hydrochloric acid, nitric acid and phosphoric acid.

3. Process as claimed in claim 1 wherein the strong acid is utilized, said acid being selected from the group consisting of monochloracetic acid, dichloracetic acid and trichloracetic acid.

4. Process as claimed in claim 1 wherein there is present an inert liquid medium.

5. Process as claimed in claim 4 wherein the inert liquid medium is selected from the group consisting of methanol, ethanol, acetic acid and water.

References Cited in the file of this patent

UNITED STATES PATENTS

| | | |
|---|---|---|
| 2,416,234 | Stillman | Feb. 18, 1947 |
| 2,548,173 | Raffauf | Apr. 10, 1951 |